United States Patent
Casmira et al.

(10) Patent No.: US 11,210,195 B2
(45) Date of Patent: Dec. 28, 2021

(54) DYNAMIC DEVICE-DETERMINED STORAGE PERFORMANCE

(71) Applicant: Intel Corporation, Santa Clara, CA (US)

(72) Inventors: Jason Casmira, North Plains, OR (US); Jawad Khan, Portland, OR (US); David Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 16/102,813

(22) Filed: Aug. 14, 2018

(65) Prior Publication Data

US 2019/0042385 A1 Feb. 7, 2019

(51) Int. Cl.
*G06F 9/50* (2006.01)
*G06F 11/30* (2006.01)
*G06F 11/34* (2006.01)

(52) U.S. Cl.
CPC ........ *G06F 11/3419* (2013.01); *G06F 9/5005* (2013.01); *G06F 11/3034* (2013.01); *G06F 11/3037* (2013.01); *G06F 2201/81* (2013.01); *G06F 2209/501* (2013.01)

(58) Field of Classification Search
CPC .............. G06F 11/3419; G06F 9/5005; G06F 11/3034; G06F 11/3037; G06F 2201/81; G06F 2209/501
See application file for complete search history.

(56) References Cited

U.S. PATENT DOCUMENTS 7,493,234 B2 * 2/2009 Greco ................. G06F 11/3409 360/31
2002/0194335 A1 * 12/2002 Maynard ................. G06F 9/505 709/225
2005/0278576 A1 * 12/2005 Hekmatpour .. G01R 31/318314 714/37
2007/0028041 A1 * 2/2007 Hallyal ............... G06F 11/2221 711/114
2008/0036014 A1 * 2/2008 Akamatsu ....... H01L 21/823462 257/391
2008/0104387 A1 * 5/2008 Owhadi .............. G06F 11/2221 713/2
2013/0060933 A1 * 3/2013 Tung ...................... H04L 41/50 709/224
2016/0299697 A1 * 10/2016 Chen ..................... G06F 3/0685
2017/0131947 A1 * 5/2017 Hoang .................... G06F 11/00
2017/0372800 A1 * 12/2017 Harijono .......... G11C 29/56004
2018/0292992 A1 * 10/2018 Kachare ............. G06F 11/3409

OTHER PUBLICATIONS

Wang, "SSD In-Storage Computing for Search Engines," IEEE, Sep. 13, 2016, 14 pages.
Kang, "Enabling Cost-effective Data Processing with Smart SSD," IEEE, Jul. 15, 2013, 12 pages.

* cited by examiner

*Primary Examiner* — Emerson C Puente
*Assistant Examiner* — Jonathan R Labud
(74) *Attorney, Agent, or Firm* — Jordan IP Law, LLC (57) ABSTRACT

An embodiment of a semiconductor apparatus may include technology to receive a request for storage-related resources, and demand-query one or more persistent storage media devices for device-determined performance-related information in response to the request, where the device-determined performance-related information is based on dynamically measured performance of persistent storage media of the device itself. Other embodiments are disclosed and claimed.

18 Claims, 6 Drawing Sheets

DYNAMIC DEVICE-DETERMINED STORAGE PERFORMANCE

TECHNICAL FIELD

Embodiments generally relate to storage systems. More particularly, embodiments relate to dynamic device-determined storage performance.

BACKGROUND

A persistent storage device, such as solid state drive (SSD) may include media such as NAND memory. Some SSDs may have limited endurance. For example, NAND memory may only be written a finite number of times, and the SSD may wear out as the SSD ages.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three-dimensional (3D) crosspoint memory device, or other byte addressable write-in-place nonvolatile memory devices. A memory device may also include random access memory (RAM). In one embodiment, the memory device may be or may include memory devices that use chalcogenide glass, multi-threshold level NAND flash memory, NOR flash memory, single or multi-level Phase Change Memory (PCM), a resistive memory, nanowire memory, nonvolatile RAM (NVRAM), ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Conventional storage devices may not include technology to report their current, actual performance capabilities. Some storage devices may store a static performance capability, which may reflect a vendor-selected representative performance which may reflect the device original datasheet specifications. For example, vendor unique NVM EXPRESS (NVMe) commands may query the storage device for its performance capabilities, and the device may return the statically stored information in response to the query. The device's actual performance may be better than initially indicated when new and may subsequently degrade to be worse than the stored performance value. Similarly, a derating factor (e.g., time-based, usage-based, etc.) may not accurately reflect the device's actual performance capabilities. Some embodiments may advantageously provide a storage device which can determine and report pertinent and accurate performance-related information for the storage device.

Figure 1:
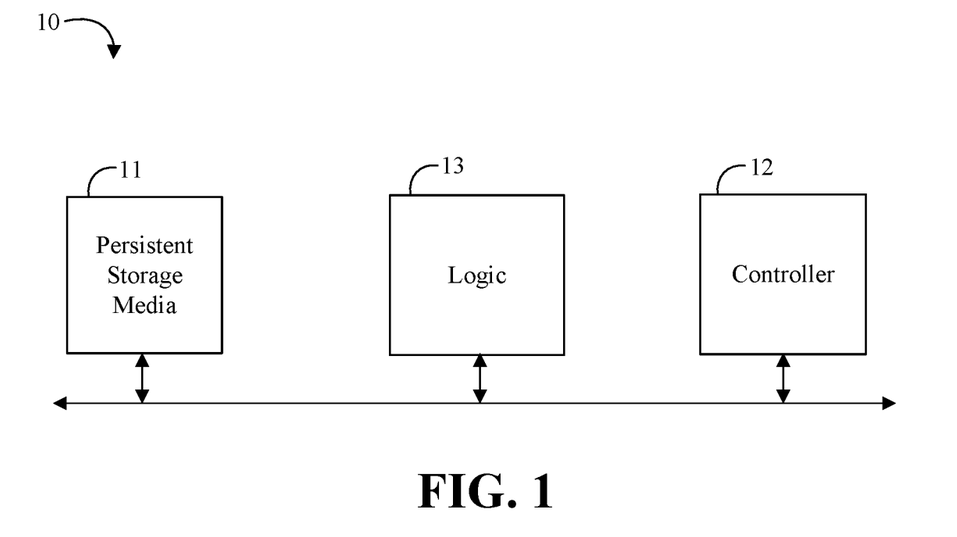
FIG. 1 is a block diagram of an example of a persistent storage media apparatus according to an embodiment.

Turning now to FIG. 1, an embodiment of a persistent storage media apparatus 10 may include persistent storage media 11, a controller 12 communicatively coupled to the persistent storage media 11, and logic 13 communicatively to the controller 12 to execute a performance test on the persistent storage media 11, and store performance-related information based on results of the executed performance test. In some embodiments, the logic 13 may be further configured to receive a demand-query for device-determined performance-related information (e.g., from a host, a controller, an agent, etc.), and return the stored performance-related information in response to the request. Some embodiments of the logic 13 may be further configured to periodically re-execute the performance test on the persistent storage media 11 (e.g., after some time threshold and/or usage threshold), and store updated performance-related information based on results of the re-executed performance test. Additionally, or alternatively, some embodiments of the logic 13 may be further configured to receive a request to re-execute the performance test on the persistent storage media 11 (e.g., from a host, a controller, an agent, etc.), re-execute the performance test on the persistent storage media 11 in response to the request, and store updated performance-related information based on results of the re-executed performance test. In some embodiments, the controller 12 and/or the logic 13 may be located in, or co-located with, various components, including the persistent storage media 11 (e.g., on a same die).

Embodiments of each of the above persistent storage media 11, controller 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 12 may include a general-purpose controller, a special purpose controller, a memory controller, a storage controller, a processor, a central processor unit (CPU), a micro-controller, etc.

Alternatively, or additionally, all or portions of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, persistent storage media 11, or other system memory may store a set of instructions which when executed by the controller 12 cause the apparatus 10 to implement one or more components, features, or aspects of the apparatus 10 (e.g., the logic 13, executing the performance test on the persistent storage media 11, storing the performance-related information based on results of the executed performance test, etc.).

For example, some embodiments of the apparatus 10 may utilize any suitable smart SSD technology, compute-in-storage technology, etc., appropriately configured to dynamically determine storage performance, as the storage media wears-out and ages. Without being limited to specific implementations, compute in-storage technology may include the ability to load and execute commands and/or applications onto the storage device itself and perform traditional compute on the storage device without having to move data off of the storage device over an input/output (I/O) interface. Some embodiments may advantageously program/configure a smart SSD or storage device with compute in-storage technology to execute a performance test on the storage media of the device, store performance-related information based on results of the executed performance test, handle a demand-query for the device-determined performance-related information (e.g., from a host, a controller, an agent, etc.), return the stored performance-related information in response to the request, etc.

Figure 2:
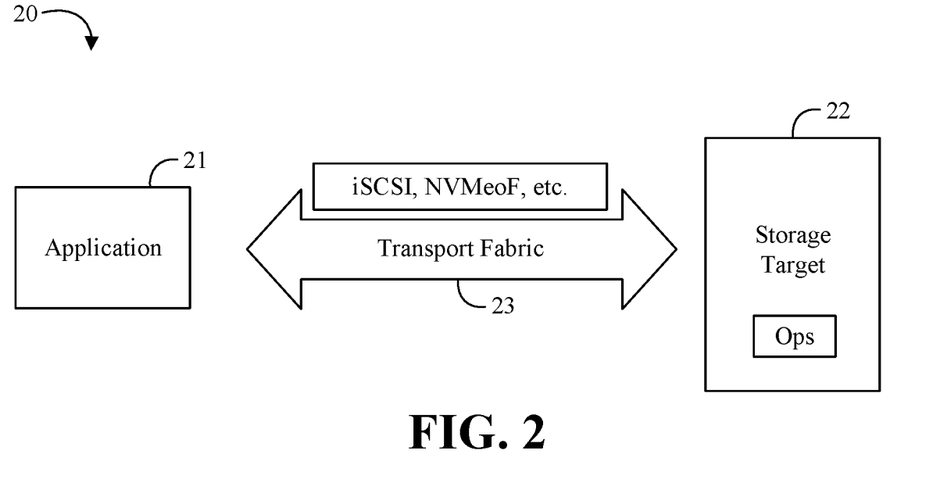
FIG. 2 is a block diagram of an example of a computing environment according to an embodiment.

Turning now to FIG. 2, an embodiment of a computing environment 20 may include an application 21 communicatively coupled (e.g., wired or wirelessly) to a storage target 22 over a bi-directional transport fabric 23. The storage target 22 may include compute-in-storage technology to perform operations (ops), commands, requests, etc., received from the application 21 over the transport fabric 23, and return corresponding results to the application 21. Some embodiments may use compute descriptors to describe block-based compute operations in a protocol agnostic fashion (e.g., to provide compatibility for many block-based storage devices or systems), and may include a modular architecture that may minimize modifications to block-based storage stacks (NVMe over Fabric (NVMEoF), internet small computer systems interface (iSCSI), etc.), while allowing for a variety of compute operations to be enabled. For example, a compute descriptor may contain three pieces of information including a list of input blocks (sectors) and the input length (the virtual input object), a list of output blocks and the output length (the virtual output object), and a compute operation. A wide variety of compute operations may be supported (e.g., search, compress, checksum, resize, etc.) and may be guided by requirements of the application 21.

Rather than change the block storage interface to one that is more suitable for compute-in-storage, such as an object-based or key-value device, some embodiments may utilize an extended block protocol to allow for programmable compute descriptors. For example, the storage target may support a new command in SCSI protocols, NVMe protocols, etc., which indicates execution of a compute operation. For example, the new command may be used to transport compute descriptors between a host and target. For the bi-directional transfer in the storage transport, the compute descriptor may be considered effectively as "output" and the result of the computation may be considered as "input" with respect to the host system.

The compute-enabled storage target 22 may communicate with the application 21 as a block storage target. In some embodiments, the application 21 may be a software storage stack, agent, etc. Compute operations may be offloaded using the new command, which wraps a compute descriptor. The compute descriptor describes the storage blocks (e.g., virtual objects) that are to be input and/or output for computation, the function to be executed, and any additional arguments to the function. The storage target 22 may then create an operation context, which provides details and temporary space for the input and results of the operation. Upon completion, the results may be either returned directly to the application 21 as part of the transport payload, or they may be written to specified block locations described in the compute descriptor. Regular read and write operations may occur as normal under the transport protocol (iSCSI, NVMEoF, etc.).

An example SCSI implementation may re-purpose a currently unused opcode (e.g., 0x99) as a new EXEC command. For example, the 0x99 opcode may be defined as a bi-directional command. The output buffer may contain the compute descriptor, as previously described, and the input buffer may contain any result. Because SCSI (and the iSCSI transport) readily support bi-directional transfers, the implementation is very straightforward, and the new EXEC command may be considered as a vendor-specific SCSI command. Unlike SCSI, bi-directional transfers in NVMe are not supported. An example NVMe implementation may define two new vendor-specific opcodes for the new command: EXEC_WRITE (0x99) and EXEC_READ (0x9a) where EXEC_WRITE is equivalent to the first phase of the SCSI bi-directional EXEC command and EXEC_READ is equivalent to the second phase.

Figure 3:
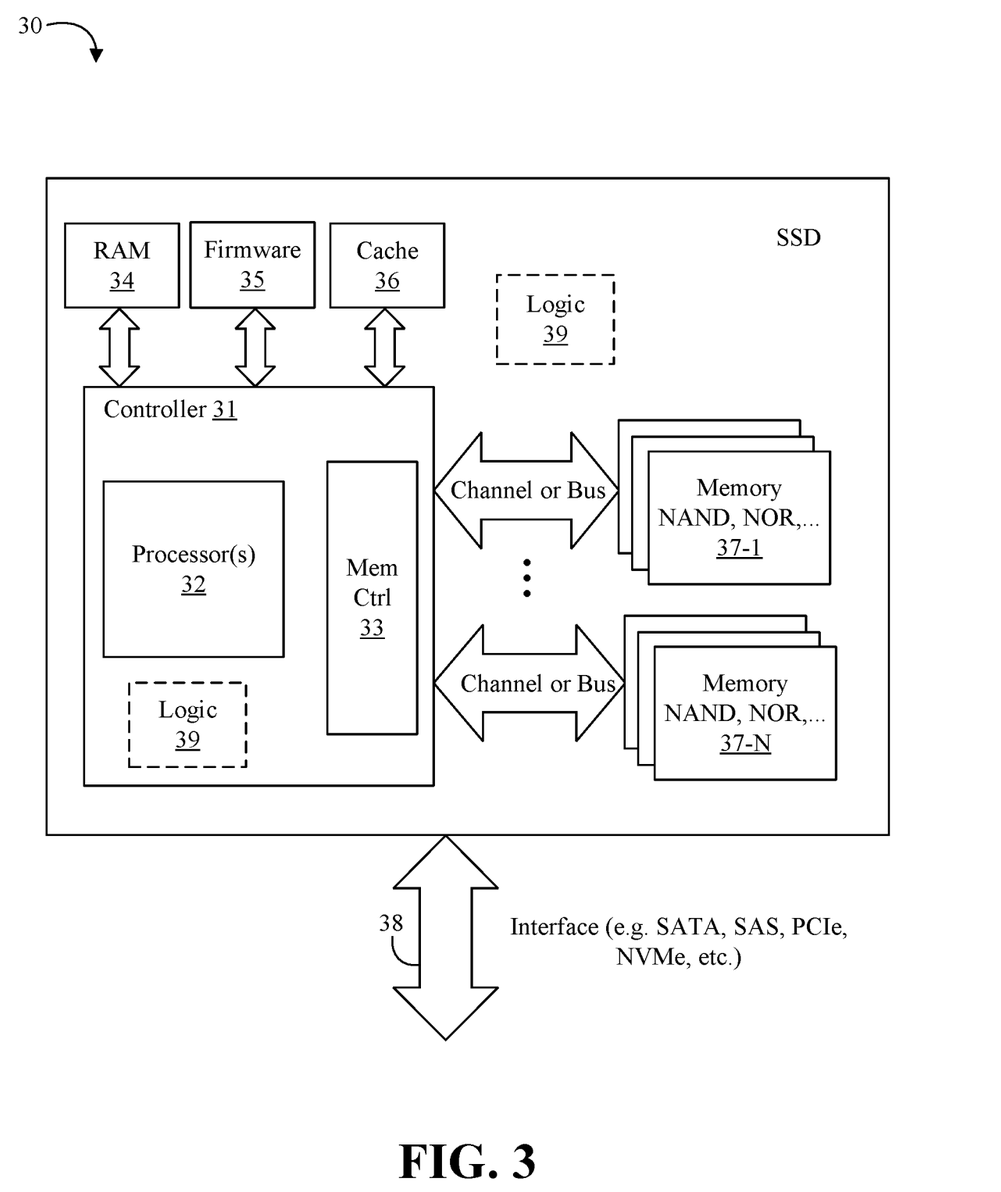
FIG. 3 is a block diagram of an example of a SSD according to an embodiment.

Turning now to FIG. 3, an embodiment of a SSD 30 may include technology to provide smart SSD functionality and/or compute-in-storage functionality. SSD 30 may include a controller 31 (which in turn includes one or more processor cores or processors 32 and memory controller logic 33), RAM 34, firmware storage 35, cache 36, and one or more memory modules or dies 37-1 to 37-N (which may include NAND flash, NOR flash, or other types of NVM/persistent storage media). Memory modules 37-1 to 37-N may be coupled to the memory controller logic 33 via one or more memory channels or busses. Also, SSD 30 communicates with external devices/controllers via an interface 38 (e.g., such as a SCSI, SATA, SAS, PCIe, NVMe, etc., interface).

One or more of the features/aspects/operations discussed with reference to FIGS. 1-2 may be performed by one or more of the components of the SSD 30. In particular, the SSD 30 may include logic 39 to execute a performance test on the memory modules 37-1 to 37-N, and store performance-related information based on results of the executed performance test (e.g., in one or more of the RAM 34, the cache 36, and the memory modules 37-1 to 37-N). In some embodiments, the logic 39 may be further configured to receive a demand-query for device-determined performance-related information (e.g., from a host, a controller, an agent, etc., over the interface 38), and return the stored performance-related information in response to the request. Some embodiments of the logic 39 may be further configured to periodically re-execute the performance test on the memory modules 37-1 to 37-N (e.g., after some time threshold and/or usage threshold), and store updated performance-related information based on results of the re-executed performance test. Additionally, or alternatively, some embodiments of the logic 39 may be further configured to receive a request to re-execute the performance test on the memory modules 37-1 to 37-N (e.g., from a host, a controller, an agent, etc.), re-execute the performance test on the memory modules 37-1 to 37-N in response to the request, and store updated performance-related information based on results of the re-executed performance test. As illustrated in FIG. 3, logic 39 may distributed throughout various locations such as inside the SSD 30 or controller 31, etc. Also, one or more of the features/aspects/operations of the SSD 30 may be programmed into the RAM 34, firmware 35, and/or cache 36. For example, the processor 32 may be able to perform many or all of the features/aspects of the logic 39 with suitable instructions/data stored in the RAM 34, firmware 35, and/or cache 36.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)). With the improved accuracy of dynamic device-determined storage performance in accordance with some embodiments, advanced telemetry systems may advantageously leverage the reported information for better resource allocation, load balancing, workload scheduling, etc.

Figure 4:
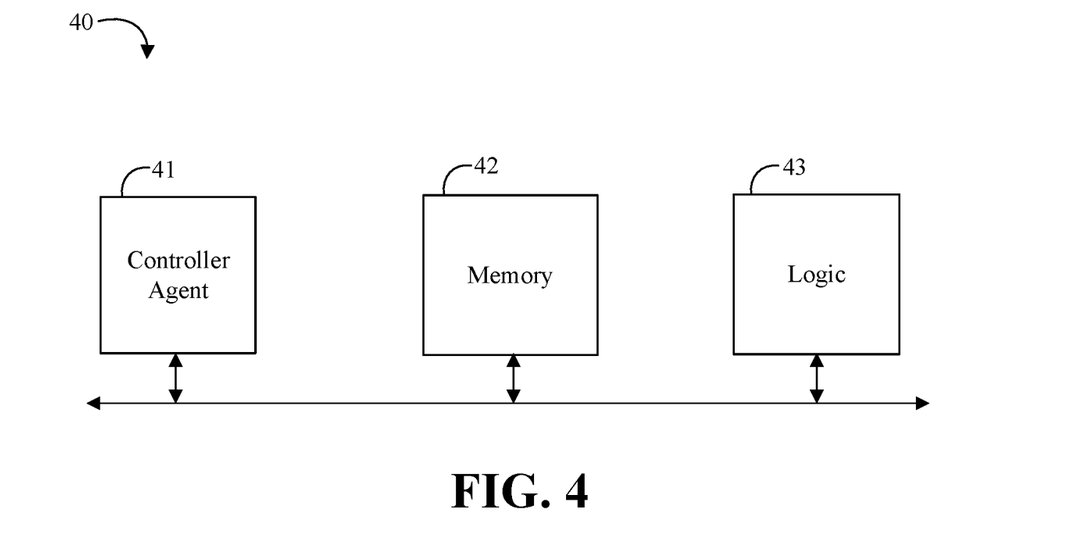
FIG. 4 is a block diagram of an example of an electronic processing system according to an embodiment.

Turning now to FIG. 4, an embodiment of an electronic processing system 40 may include a controller agent 41, memory 42 communicatively coupled to the a controller agent 41, and logic 43 communicatively coupled to the controller agent 41 to receive a request for storage-related resources, and demand-query one or more persistent storage media devices for device-determined performance-related information in response to the request, where the device-determined performance-related information is based on dynamically measured performance of persistent storage media of the device itself. In some embodiments, the logic 43 may be further configured to determine if the device-determined performance-related information was measured within one or more of a pre-determined time threshold and a pre-determined threshold for usage of the persistent storage media. For example, the logic 43 may also be configured to request execution of a performance-reporting test on one or more of the persistent storage media devices, and/or to communicate the device-determined performance-related information to a host device. In some embodiments, the logic 43 may be further configured to manage one of a new job and a prior job based on the device-determined performance-related information, and/or to manage one or more resource allocations based on the device-determined performance-related information. For example, the persistent storage media devices may include one or more solid state drives. In some embodiments, the logic 43 may be located in, or co-located with, various components, including the controller agent 41 (e.g., on a same die).

Embodiments of each of the above controller agent 41, memory 42, logic 43, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller agent 41 may include a general purpose controller, a special purpose controller, a processor, a central processor unit (CPU), a micro-controller, a software agent, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 42, the persistent storage media devices, or other system memory may store a set of instructions which when executed by the controller 41 cause the system 40 to implement one or more components, features, or aspects of the system 40 (e.g., the logic 43, receiving the request for storage-related resources, demand-querying the persistent storage media device(s) for the device-determined performance-related information, etc.).

Figure 5:
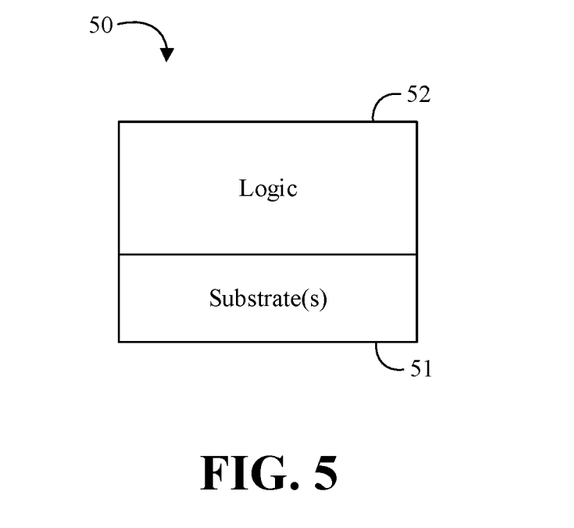
FIG. 5 is a block diagram of an example of a semiconductor apparatus according to an embodiment.

Turning now to FIG. 5, an embodiment of a semiconductor apparatus 50 may include one or more substrates 51, and logic 52 coupled to the one or more substrates 51, wherein the logic 52 is at least partly implemented in one or more of configurable logic and fixed-functionality hardware logic. The logic 52 coupled to the one or more substrates 51 may be configured to receive a request for storage-related resources, and demand-query one or more persistent storage media devices for device-determined performance-related information in response to the request, where the device-determined performance-related information is based on dynamically measured performance of the persistent storage media of the device itself. In some embodiments, the logic 52 may be further configured to determine if the device-determined performance-related information was measured within one or more of a pre-determined time threshold and a pre-determined threshold for usage of the persistent storage media. For example, the logic 52 may also be configured to request execution of a performance-reporting test on one or more of the persistent storage media devices, and/or to communicate the device-determined performance-related information to a host device. In some embodiments, the logic 52 may be further configured to manage one of a new job and a prior job based on the device-determined performance-related information, and/or to manage one or more resource allocations based on the device-determined performance-related information. For example, the persistent storage media devices may include one or more solid state drives. In some embodiments, the logic 52 coupled to the one or more substrates 51 may include transistor channel regions that are positioned within the one or more substrates 51.

Embodiments of logic 52, and other components of the apparatus 50, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 50 may implement one or more aspects of the method 60 (FIG. 6), or any of the embodiments discussed herein. In some embodiments, the illustrated apparatus 50 may include the one or more substrates 51 (e.g., silicon, sapphire, gallium arsenide) and the logic 52 (e.g., transistor array and other integrated circuit/IC components) coupled to the substrate(s) 51. The logic 52 may be implemented at least partly in configurable logic or fixed-functionality logic hardware. In one example, the logic 52 may include transistor channel regions that are positioned (e.g., embedded) within the substrate(s) 51. Thus, the interface between the logic 52 and the substrate(s) 51 may not be an abrupt junction. The logic 52 may also be considered to include an epitaxial layer that is grown on an initial wafer of the substrate(s) 51.

Figure 6:
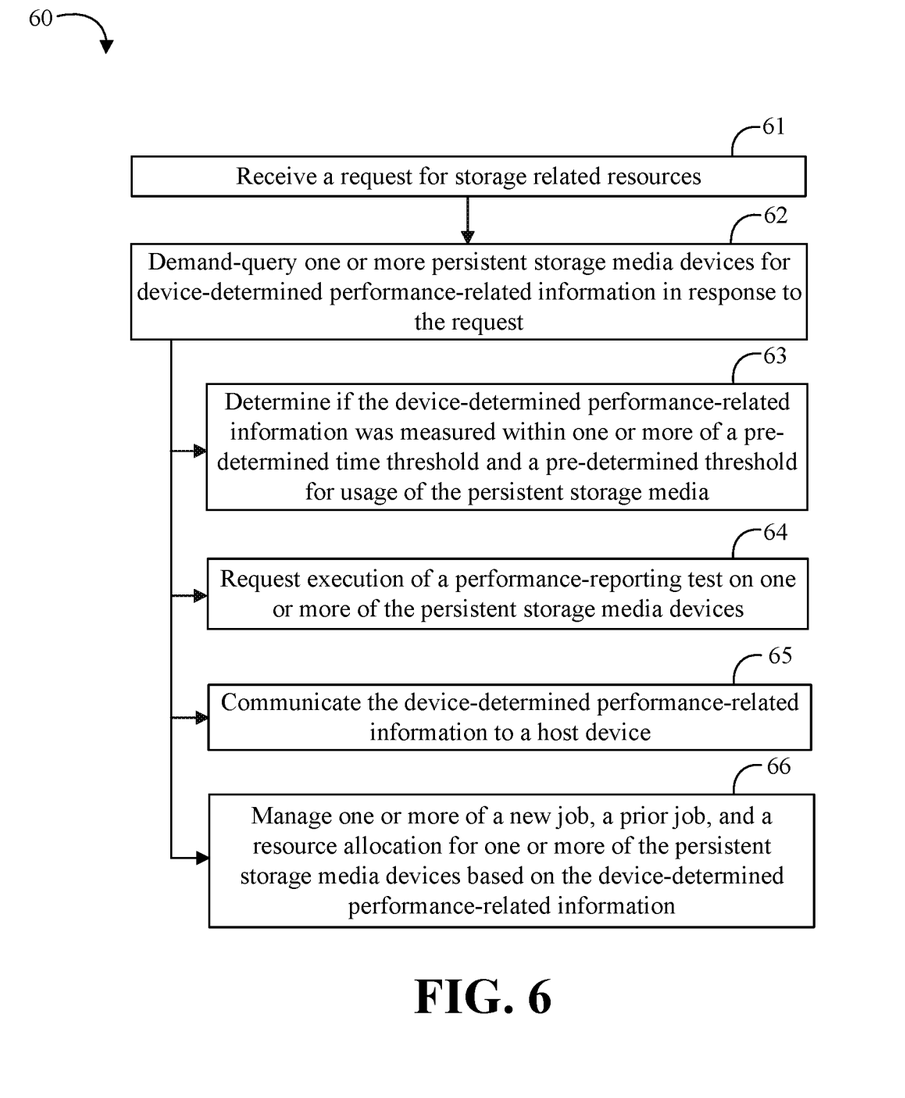
FIG. 6 is a flowchart of an example of a method of managing storage according to an embodiment.

Turning now to FIG. 6, an embodiment of a method 60 of managing storage may include receiving a request for storage-related resources at block 61, and demand-querying one or more persistent storage media devices for device-determined performance-related information in response to the request at block 62, where the device-determined performance-related information may be based on dynamically measured performance of the persistent storage media of the device itself. Some embodiments of the method 60 may further include determining if the device-determined performance-related information was measured within one or more of a pre-determined time threshold and a pre-determined threshold for usage of the persistent storage media at block 63, and/or requesting execution of a performance-reporting test on one or more of the persistent storage media devices at block 64. The method 60 may also include communicating the device-determined performance-related information to a host device at block 65, and/or managing one or more of a new job, a prior job, and a resource allocation for one or more of the persistent storage media devices based on the device-determined performance-related information at block 66.

Embodiments of the method 60 may be implemented in a system, apparatus, computer, device, etc., for example, such as those described herein. More particularly, hardware implementations of the method 60 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 60 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 60 may be implemented on a computer readable medium as described in connection with Examples 21 to 27 below. Embodiments or portions of the method 60 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for dynamically determining storage performance, as the SSDs wear-out and age. Currently there is no way to determine how performant a storage device is over time as it ages/wears. This is a problem for cloud computing environments which may distribute a workload based on expected performance/availability of resources to meet some expected reliability/availability/serviceability (RAS) requirements. For example, a cloud service provider (CSP) may meter and bill based on only the tenant's usage, and may also provide a service level agreement (SLA) to ensure that the customer/tenant's computing needs are met (e.g., and if not being met, to migrate the tenant job to another system that will meet the SLA). Distributed storage in a cloud computing environment may be more complex because the environment may include a collection of drives (e.g., versus a singular drive in isolation) aggregating a logical storage volume to a tenant, where the lowest-performing device may dictate quality of service (QoS) and long tail-latencies may impact the delivered performance.

Some embodiments may advantageously provide technology to demand-query a drive for its current performance capability, and technology to execute a pertinent and accurate performance-reporting test on the storage device. Some embodiments may further provide technology to communicate this performance result back to an initiating host. In some embodiments, a controlling agent may consume the performance result and leverage the information such that the agent may schedule new jobs or move currently running jobs onto resources to improve performance and/or meet a tenant's SLA. For example, the agent may be a secure agent that establishes trust with the storage device (e.g., via a secure handshake, challenge/response, etc.). The controlling agent may execute in a trusted execution environment and the operations of the controlling agent may be transparent to the host, customer, CSP, etc. For example, the reported performance information may remain secret and the reported performance capability feedback may only be provided to a vendor-controlled agent. The controlling agent may receive performance requirement information (e.g., from a host) and dynamic device-determined performance capability information (e.g., from the storage devices), and may thereafter balance the workload to meet the performance requirement based on the devices' actual performance capability (e.g., rather than a statically stored datasheet specification).

Figure 7:
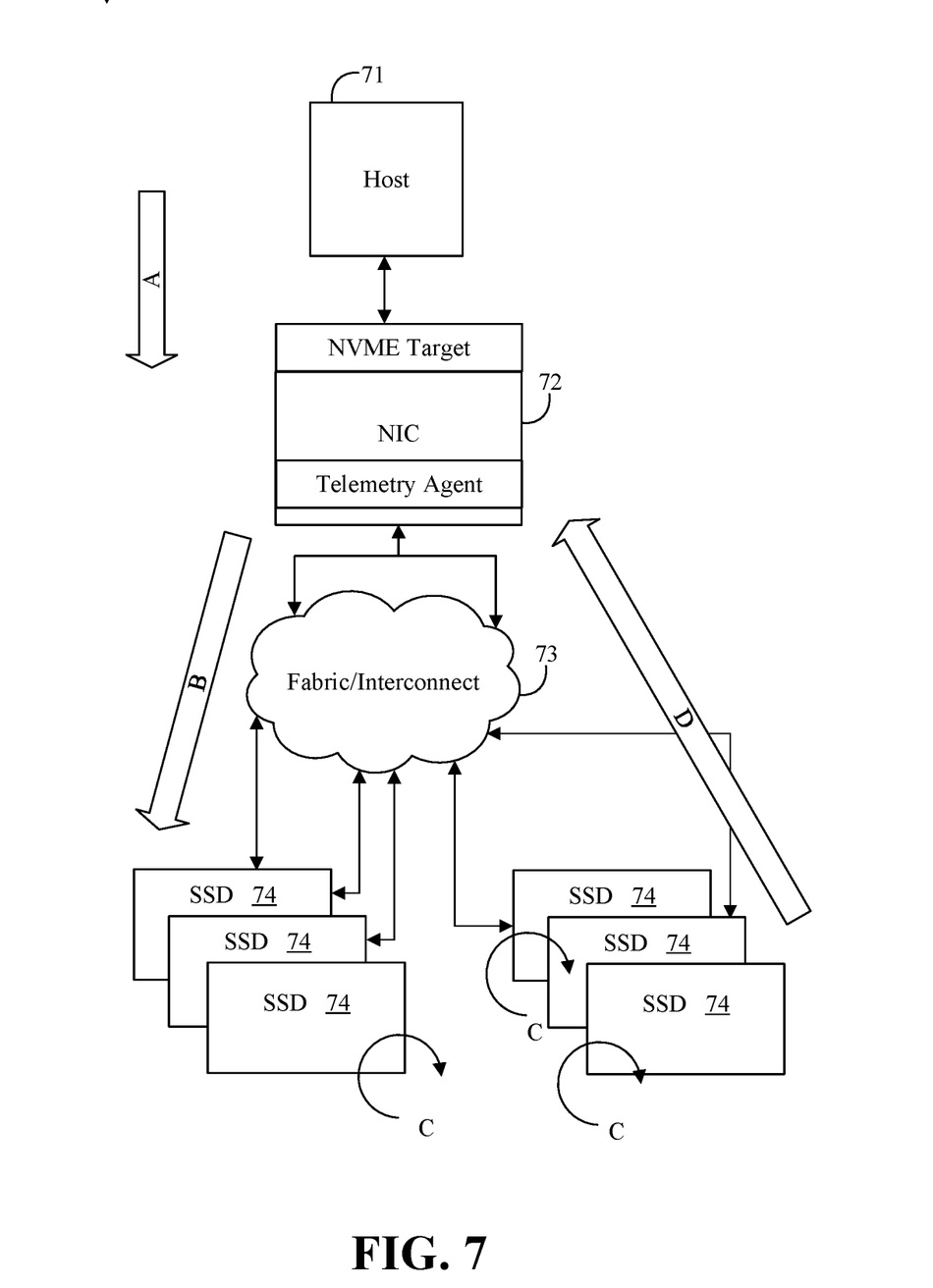
FIG. 7 is a block diagram of an example of a cloud computing environment according to an embodiment.

Turning now to FIG. 7, a cloud computing environment 70 may include a host 71 communicatively coupled through an agent 72 and a fabric/interconnect 73 to a plurality of SSD devices 74. The SSD devices 74 may be configured as a collection of drives which are aggregated by the agent 72 into a logical storage device for use by the host 71 (e.g., a tenant application). The agent 72 may present itself as an NVMe target to the host 71, and may include a network interface card (NIC) to interface with the fabric/interconnect 73. One or more of the SSD devices 74 may include compute-in-storage technology to dynamically determine and report the device's actual performance capability. The agent 72 may further include a telemetry agent to remotely collect the performance data from the SSD devices 74.

Arrow A may correspond to a request from the host 71 to configure and aggregate storage into a virtual device for use by the tenant. The telemetry agent may then consult its internal state of storage performance capabilities and aggregate the storage for use. For example, the telemetry agent may consume the performance result(s) and leverage the information such that the agent 72 may schedule new jobs or move currently running jobs onto resources to improve performance and/or meet the tenant's SLA. Periodically, the agent 72 may update its internal state so that the state is current and ready when a new request comes in.

As discussed above, some smart SSD/compute-in-storage technology may use a reserved opcode to pass a command and data pointers to the storage system, allowing the storage devices to perform actual processing on the data range based on the operation specified in the command. Some embodiments may provide a command operation (e.g., a MD5 hash or some other benchmark) to be run on the storage device over time, and to record the result to indicate if the operation is taking more time (e.g., longer latency) as the drive ages and wears. Arrow B may correspond to the agent 72 providing the command to the SSD devices 74. Arrows C may correspond to the performance test being executed on one or more the SSD devices 74. Arrow D may correspond to the results being reported back to the agent 72 from the SSD devices 74. The results from the performance operation may be retained in the telemetry agent state for use on subsequent job requests from the host 71.

Figure 8:
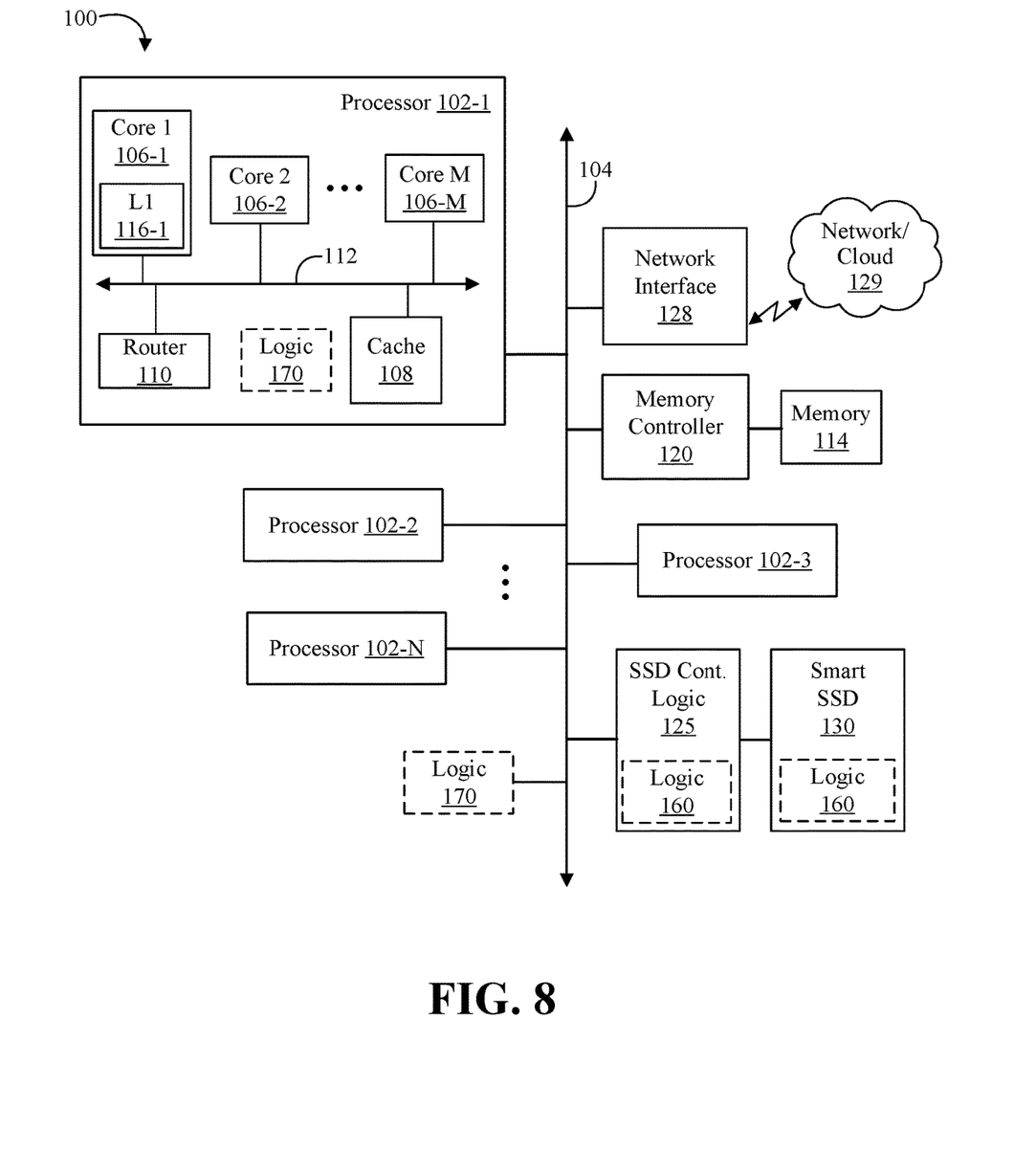
FIG. 8 is a block diagram of an example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as an SSD 130 coupled to the interconnect 104 via SSD controller logic 125. Hence, logic 125 may control access by various components of system 100 to the SSD 130. In some embodiments, the SSD 130 may include similar technology as discussed in connection with the SSD 30 (FIG. 3). Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic (such as those discussed with reference to FIG. 3) or provided on a same integrated circuit (IC) device in various embodiments (e.g., on the same IC device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein such as those discussed with reference to other figures including FIGS. 1-7, for example), including the cores 106, interconnections 104 or 112, components outside of the processor 102, SSD 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc. As shown in FIG. 8, features or aspects of the logic 125, the logic 160, and/or the logic 170 may be distributed throughout the system 100, and/or co-located/integrated with various components of the system 100.

As illustrated in FIG. 8, SSD 130 may include logic 160, which may be in the same enclosure as the SSD 130 and/or fully integrated on a printed circuit board (PCB) of the SSD 130. Logic 160 advantageously provides technology to dynamically determine a performance capability of the SSD 130. For example, the logic 160 may implement one or more aspects of the method 60 (FIG. 6). For example, the logic 160 may further include technology to execute a performance test on the SSD 130, and store performance-related information based on results of the executed performance test. In some embodiments, the logic 160 may be further configured to receive a demand-query for device-determined performance-related information (e.g., from a host, a controller, an agent, etc.), and return the stored performance-related information in response to the request. Some embodiments of the logic 160 may be further configured to periodically re-execute the performance test on the SSD 130 (e.g., after some time threshold and/or usage threshold), and store updated performance-related information based on results of the re-executed performance test. Additionally, or alternatively, some embodiments of the logic 160 may be further configured to receive a request to re-execute the performance test on the SSD 130 (e.g., from a host, a controller, an agent, etc.), re-execute the performance test on the SSD 130 in response to the request, and store updated performance-related information based on results of the re-executed performance test. In other embodiments, the SSD 130 may be replaced with any suitable persistent storage technology/media. In some embodiments, the logic 160 may be coupled to one or more substrates (e.g., silicon, sapphire, gallium arsenide, PCB, etc.), and may include transistor channel regions that are positioned within the one or more substrates.

The logic 170 in the system 100 may include technology to manage resources based on the dynamically determined performance capability of the SSD 130. For example, the logic 170 may be further configured to provide an agent (e.g., including a telemetry agent) as discussed herein. In particular the logic 170 may include technology to receive a request for storage-related resources, and demand-query one or more persistent storage media devices (e.g., including the SSD 130) for device-determined performance-related information in response to the request, where the device-determined performance-related information is based on dynamically measured performance of the persistent storage media of the device itself. In some embodiments, the logic 170 may be further configured to determine if the device-determined performance-related information was measured within one or more of a pre-determined time threshold and a pre-determined threshold for usage of the persistent storage media. For example, the logic 170 may also be configured to request execution of a performance-reporting test on one or more of the persistent storage media devices, and/or to communicate the device-determined performance-related information to a host device. In some embodiments, the logic 170 may be further configured to manage one of a new job and a prior job based on the device-determined performance-related information, and/or to manage one or more resource allocations based on the device-determined performance-related information.

ADDITIONAL NOTES AND EXAMPLES

Example 1 may include an electronic processing system, comprising memory, a controller agent communicatively coupled to the memory, and logic communicatively coupled to the controller agent to receive a request for storage-related resources, and demand-query one or more persistent storage media devices for device-determined performance-related information in response to the request, where the device-determined performance-related information is based on dynamically measured performance of persistent storage media of the device itself.

Example 2 may include the system of Example 1, wherein the logic is further to determine if the device-determined performance-related information was measured within one or more of a pre-determined time threshold and a pre-determined threshold for usage of the persistent storage media.

Example 3 may include the system of any of Examples 1 to 2, wherein the logic is further to request execution of a performance-reporting test on one or more of the persistent storage media devices.

Example 4 may include the system of any of Examples 1 to 3, wherein the logic is further to communicate the device-determined performance-related information to a host device.

Example 5 may include the system of any of Examples 1 to 4, wherein the logic is further to manage one of a new job and a prior job based on the device-determined performance-related information.

Example 6 may include the system of any of Examples 1 to 5, wherein the logic is further to manage one or more resource allocations based on the device-determined performance-related information.

Example 7 may include the system of any of Examples 1 to 6, wherein the persistent storage media devices comprise one or more solid state drives.

Example 8 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to receive a request for storage-related resources, and demand-query one or more persistent storage media devices for device-determined performance-related information in response to the request, where the device-determined performance-related information is based on dynamically measured performance of persistent storage media of the device itself.

Example 9 may include the apparatus of Example 8, wherein the logic is further to determine if the device-determined performance-related information was measured within one or more of a pre-determined time threshold and a pre-determined threshold for usage of the persistent storage media.

Example 10 may include the apparatus of any of Examples 8 to 9, wherein the logic is further to request execution of a performance-reporting test on one or more of the persistent storage media devices.

Example 11 may include the apparatus of any of Examples 8 to 10, wherein the logic is further to communicate the device-determined performance-related information to a host device.

Example 12 may include the apparatus of any of Examples 8 to 11, wherein the logic is further to manage one of a new job and a prior job based on the device-determined performance-related information.

Example 13 may include the apparatus of any of Examples 8 to 12, wherein the logic is further to manage resource allocations based on the device-determined performance-related information.

Example 14 may include the apparatus of any of Examples 8 to 13, wherein the persistent storage media devices comprise one or more solid state drives.

Example 15 may include the apparatus of any of Examples 8 to 15, wherein the logic coupled to the one or more substrates includes transistor channel regions that are positioned within the one or more substrates.

Example 16 may include a method of managing storage, comprising receiving a request for storage-related resources, and demand-querying one or more persistent storage media devices for device-determined performance-related information in response to the request, where the device-determined performance-related information is based on dynamically measured performance of persistent storage media of the device itself.

Example 17 may include the method of Example 16, further comprising determining if the device-determined performance-related information was measured within one or more of a pre-determined time threshold and a pre-determined threshold for usage of the persistent storage media.

Example 18 may include the method of any of Examples 16 to 17, further comprising requesting execution of a performance-reporting test on one or more of the persistent storage media devices.

Example 19 may include the method of any of Examples 16 to 18, further comprising communicating the device-determined performance-related information to a host device.

Example 20 may include the method of any of Examples 16 to 19, further comprising managing one or more of a new job, a prior job, and a resource allocation for one or more of the persistent storage media devices based on the device-determined performance-related information.

Example 21 may include at least one computer readable storage medium, comprising a set of instructions, which when executed by a computing device, cause the computing device to receive a request for storage-related resources, and demand-query one or more persistent storage media devices for device-determined performance-related information in response to the request, where the device-determined performance-related information is based on dynamically measured performance of persistent storage media of the device itself.

Example 22 may include the at least one computer readable storage medium of Example 21, comprising a further set of instructions, which when executed by the computing device, cause the computing device to determine if the device-determined performance-related information was measured within one or more of a pre-determined time threshold and a pre-determined threshold for usage of the persistent storage media.

Example 23 may include the at least one computer readable storage medium of any of Examples 21 to 22, comprising a further set of instructions, which when executed by the computing device, cause the computing device to request execution of a performance-reporting test on one or more of the persistent storage media devices.

Example 24 may include the at least one computer readable storage medium of any of Examples 21 to 23, comprising a further set of instructions, which when executed by the computing device, cause the computing device to communicate the device-determined performance-related information to a host device.

Example 25 may include the at least one computer readable storage medium of any of Examples 21 to 24, comprising a further set of instructions, which when executed by the computing device, cause the computing device to manage one of a new job and a prior job based on the device-determined performance-related information.

Example 26 may include the at least one computer readable storage medium of any of Examples 21 to 25, comprising a further set of instructions, which when executed by the computing device, cause the computing device to manage resource allocations based on the device-determined performance-related information.

Example 27 may include the at least one computer readable storage medium of any of Examples 21 to 26, wherein the persistent storage media devices comprise one or more solid state drives.

Example 28 may include a storage manager apparatus, comprising means for receiving a request for storage-related resources, and means for demand-querying one or more persistent storage media devices for device-determined performance-related information in response to the request, where the device-determined performance-related information is based on dynamically measured performance of persistent storage media of the device itself.

Example 29 may include the apparatus of Example 28, further comprising means for determining if the device-determined performance-related information was measured within one or more of a pre-determined time threshold and a pre-determined threshold for usage of the persistent storage media.

Example 30 may include the apparatus of any of Examples 28 to 29, further comprising means for requesting execution of a performance-reporting test on one or more of the persistent storage media devices.

Example 31 may include the apparatus of any of Examples 28 to 30, further comprising means for communicating the device-determined performance-related information to a host device.

Example 32 may include the me apparatus thod of any of Examples 28 to 31, further comprising means for managing one or more of a new job, a prior job, and a resource allocation for one or more of the persistent storage media devices based on the device-determined performance-related information.

Example 33 may include a persistent storage media apparatus, comprising persistent storage media, a controller communicatively coupled to the persistent storage media, and logic communicatively to the controller to execute a performance test on the persistent storage media, and store performance-related information based on results of the executed performance test.

Example 34 may include the persistent storage media apparatus of Example 33, wherein the logic is further to receive a demand-query for device-determined performance-related information, and return the stored performance-related information in response to the request.

Example 35 may include the persistent storage media apparatus of any of Examples 33 to 34, wherein the logic is further to periodically re-execute the performance test on the persistent storage media, and store updated performance-related information based on results of the re-executed performance test.

Example 36 may include the persistent storage media apparatus of any of Examples 33 to 35, wherein the logic is further to receive a request to re-execute the performance test on the persistent storage media, re-execute the performance test on the persistent storage media in response to the request, and store updated performance-related information based on results of the re-executed performance test.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   memory;
   a controller agent communicatively coupled to the memory; and
   logic communicatively coupled to the controller agent to:
   periodically execute a performance-reporting test on one or more persistent storage media devices for device-determined performance-related information and store the device-determined performance-related information on the one or more persistent storage media devices;
   receive a request to re-execute the performance-reporting test from a host device in a cloud computing environment;
   re-execute the performance-reporting test and store the device-determined performance-related information on the one or more persistent storage media devices in response to the request to re-execute the performance-reporting test;
   receive a request for storage-related resources from the host device, and
   demand-query the one or more persistent storage media devices for the stored device-determined performance-related information in response to the request based on the executed performance-reporting test, wherein the persistent storage media devices comprise one or more solid state drives distributed in the cloud computing environment, where the device-determined performance-related information is based on dynamically measured performance of persistent storage media of the device itself.

2. The system of claim 1, wherein the logic is further to:
determine if the device-determined performance-related information was measured within one or more of a pre-determined time threshold and a pre-determined threshold for usage of the persistent storage media.

3. The system of claim 1, wherein the logic is further to:
request execution of the performance-reporting test on one or more of the persistent storage media devices.

4. The system of claim 1, wherein the logic is further to:
communicate the device-determined performance-related information to the host device.

5. The system of claim 1, wherein the logic is further to:
manage one of a new job and a prior job based on the device-determined performance-related information.

6. The system of claim 1, wherein the logic is further to:
manage one or more resource allocations based on the device-determined performance-related information.

7. A semiconductor apparatus, comprising:
one or more substrates; and
logic coupled to the one or more substrates, wherein the logic is at least partly implemented in one or more of configurable logic and fixed-functionality hardware logic, the logic coupled to the one or more substrates to:
periodically execute a performance-reporting test on one or more persistent storage media devices for device-determined performance-related information and store the device-determined performance-related information on the one or more persistent storage media devices;
receive a request to re-execute the performance-reporting test from a host device in a cloud computing environment;
re-execute the performance-reporting test and store the device-determined performance-related information on the one or more persistent storage media devices in response to the request to re-execute the performance-reporting test;
receive a request for storage-related resources from the host device, and
demand-query the one or more persistent storage media devices for the stored device-determined performance-related information in response to the request based on the executed performance-reporting test, wherein the persistent storage media devices comprise one or more solid state drives distributed in the cloud computing environment, where the device-determined performance-related information is based on dynamically measured performance of persistent storage media of the device itself.

8. The apparatus of claim 7, wherein the logic is further to:
determine if the device-determined performance-related information was measured within one or more of a pre-determined time threshold and a pre-determined threshold for usage of the persistent storage media.

9. The apparatus of claim 7, wherein the logic is further to:
request execution of the performance-reporting test on one or more of the persistent storage media devices.

10. The apparatus of claim 7, wherein the logic is further to:
communicate the device-determined performance-related information to the host device.

11. The apparatus of claim 7, wherein the logic is further to:
manage one of a new job and a prior job based on the device-determined performance-related information.

12. The apparatus of claim 7, wherein the logic is further to:
manage resource allocations based on the device-determined performance-related information.

13. The apparatus of claim 7, wherein the logic coupled to the one or more substrates includes transistor channel regions that are positioned within the one or more substrates.

14. A method of managing storage, comprising:
periodically executing a performance-reporting test on one or more persistent storage media devices for device-determined performance-related information and storing the device-determined performance-related information on the one or more persistent storage media devices;
receiving a request to re-execute the performance-reporting test from a host device in a cloud computing environment;
re-executing the performance-reporting test and storing the device-determined performance-related information on the one or more persistent storage media devices in response to the request to re-execute the performance-reporting test;
receiving a request for storage-related resources from the host device; and
demand-querying the one or more persistent storage media devices for the stored device-determined performance-related information in response to the request based on the executed performance-reporting test, wherein the persistent storage media devices comprise one or more solid state drives distributed in the cloud computing environment, where the device-determined performance-related information is based on dynamically measured performance of persistent storage media of the device itself.

15. The method of claim 14, further comprising:
determining if the device-determined performance-related information was measured within one or more of a pre-determined time threshold and a pre-determined threshold for usage of the persistent storage media.

16. The method of claim 14, further comprising:
requesting execution of the performance-reporting test on one or more of the persistent storage media devices.

17. The method of claim 14, further comprising:
communicating the device-determined performance-related information to the host device.

18. The method of claim 14, further comprising:
managing one or more of a new job, a prior job, and a resource allocation for one or more of the persistent storage media devices based on the device-determined performance-related information.

* * * * *